July 15, 1924.

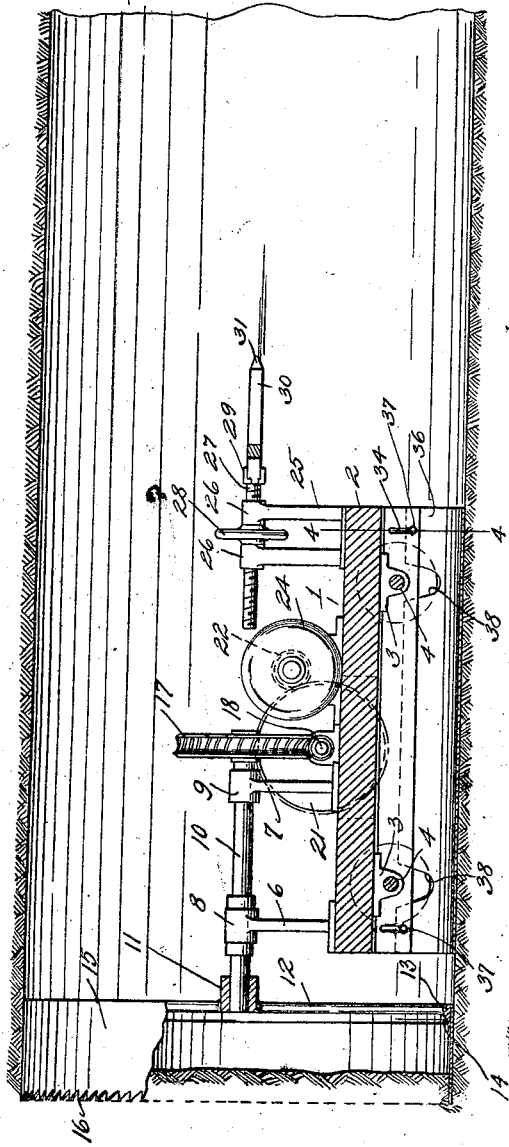

J. W. BLOWER 1,501,093

COAL CUTTING MACHINE

Filed March 20, 1922    2 Sheets-Sheet 2

Inventor
Joseph W. Blower
By C. C. Shepherd
Attorney

Patented July 15, 1924.

1,501,093

UNITED STATES PATENT OFFICE.

JOSEPH W. BLOWER, OF COLUMBUS, OHIO.

COAL-CUTTING MACHINE.

Application filed March 20, 1922. Serial No. 545,148.

*To all whom it may concern:*

Be it known that JOSEPH W. BLOWER, a citizen of the United States, residing at Columbus, in the county of Franklin and State of Ohio, has invented certain new and useful Improvements in Coal-Cutting Machines, of which the following is a specification.

The present invention is directed to a coal cutting machine, and has for its primary object to so construct a machine of this character that it can be moved forwardly to perform the cutting operation, a circular core being formed in the head of the tunnel.

A further object of the invention is to provide a coal cutting machine having a circular cutting head which is rotatable, the head being gradually moved into the vein of coal as the machine feeds forwardly, thereby forming a circular core which can be easily broken down.

A still further object of the invention is to provide a machine of this nature with a trough to facilitate the removal of the coal from the head of the tunnel after the core has been broken down.

Still another object of the invention is to provide a machine which includes a wheeled truck which supports the operating mechanism for the circular cutting head, the wheels of the truck being designed to roll upon the floor of the tunnel.

A still further object of the invention is to provide novel means for feeding the truck forwardly so that the cutting head will be gradually moved into the head of the tunnel to perform its sawing operation.

With these and other objects in view, as will appear as the description proceeds, the invention consists in the novel features of construction, combinations of elements and arrangements of parts and hereinafter to be fully described and pointed out in the appended claims.

In the accompanying drawing:

Figure 1 is a side elevation of the device.

Figure 2 is a top plan view, showing the feeding device in its operative position.

Figure 3:
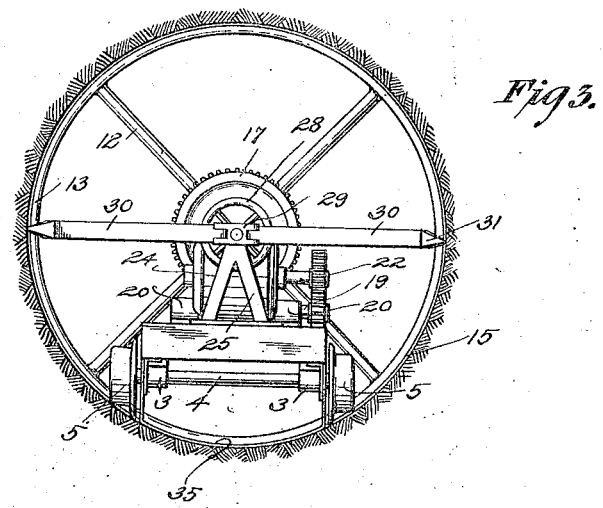
Figure 3 is a rear elevation of the machine.
Figure 4:
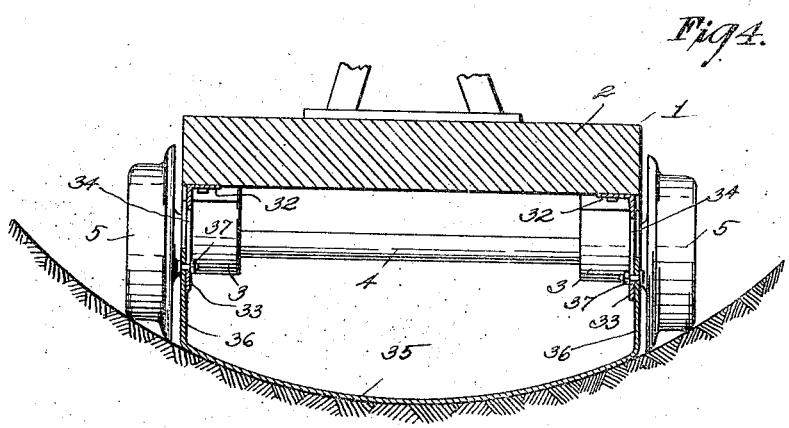
Figure 4 is a sectional view on line 4—4 of Figure 1.
Figure 5:
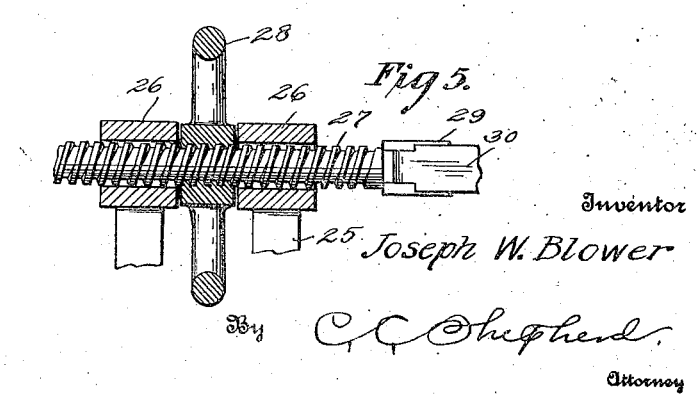
Figure 5 is a sectional view on line 5—5 of Figure 2.

Referring to the drawing, 1 designates the truck, which comprises a platform 2, said platform being provided with journal boxes 3, said journal boxes having engaged therein axles 4 to the outer ends of which are secured flanged wheels 5.

Mounted upon the platform 2 are brackets 6 and 7, said brackets being provided with journal boxes 8 and 9, respectively. Journaled in the boxes 8 and 9 is a shaft 10 the forward end of which having secured thereto the hub 11, and radiating from said hub are spokes 12, preferably four in number, to the outer ends of which is secured a felly 13. The inner face of the felly 13 is inclined as at 14, the purpose of which will appear later.

A band 15 encircles the felly 13 and has its rear end suitably secured thereto, the forward edge of said band being provided with cutting teeth 16.

Fixed to the rear end of the shaft 10 is a worm-wheel 17 which meshes with a worm 18 carried by the shaft 19 which is supported in boxes 20 carried by the platform 2. Fixed to the outer end of the shaft 19 is a gear 21 which meshes with a pinion 22 carried by the shaft 23 of the motor 24.

Mounted on the rear end of the platform 2 is a bracket 25, said bracket having boxes 26 carried thereby and in which is engaged a threaded shaft 27. Located between the boxes 26 is a hand wheel 28, said wheel having its hub in threaded engagement with the shaft 27, and since the wheel is located between the boxes 26 it is obvious that when rotary movement is imparted to the wheel that the shaft 27 will be compelled to move longitudinally in the desired direction.

Connected with the rear end of the shaft 27 is a block 29 to which are pivoted the rear ends of the bars 30, said bars having pointed ends 31 adapted to bite the side wall of a tunnel, the purpose of which will later appear.

Secured in parallel relation under the platform 2 are angle iron sills 32, the vertical webs 33 thereof being provided adjacent each end with vertical slots 34. A sheet metal trough 35 is employed and has its sides 36 arranged to overlap the vertical webs 33, said sides having carried thereby bolts 37 which engage the slots 34. Owing to the presence of the slots 34 it is obvious that the trough 35 can be raised and held in its elevated position upon the manipulation of the bolts 37.

The sides 36 of the trough are provided with cut away portions 38 to accommodate the journal boxes 3.

Since the band 15 is circular the teeth thereof will cut into the vein so as to produce a circular core, and consequently the tunnel will be circular in cross section. This being the case the wheels 8 will travel upon the floor of the tunnel, and the machine can be moved backwardly and forwardly without aid of the usual rails.

When it is desired to feed the machine forward as the teeth 16 cut the material the hand wheel 28 is rotated in a direction to cause the threaded shaft 27 to move rearwardly, and since the bars 30 are engaged with the side walls of the tunnel they will tend to straighten, which will naturally cause the machine to move forwardly so that the teeth 16 will engage the material to be cut. The band 15 is comparatively wide so that upon each feeding operation a core of considerable size will be formed. After the core has been formed the machine is moved rearwardly, after which the core is broken down in any conventional manner. After the core has been broken down the resultant lumps will lie in front of the band 15, and in order to remove these lumps a suitable rake or the like is used to pull the material through the spokes 12 and on to the trough 35. The lumps are then raked from the trough and are removed from the tunnel in a desired manner. Owing to the smooth formation of the trough the coal can be easily raked therefrom and from under the machine with very little effort, since the trough covers the bottom of the tunnel, which is comparatively rough and naturally would retard the raking action.

It will be of course understood that rotary motion is imparted to the band 15 through the worm-wheel 17, this movement being obtained by rotating the worm 18, the motor 24 furnishing the power to the worm through the gear 21 and pinion 22.

When it is desired to remove the machine from the tunnel the trough 35 is elevated so as to prevent the same from dragging on the ground as the machine is being moved, but this trough can be lowered and will freely slide upon the floor of a tunnel, said trough being curved transversely so as to comform to the curvature of the tunnel floor.

What I claim is:

1. In a machine of the class described, the combination with a wheeled truck, of a tubular saw rotatably supported by the truck, a vertically adjustable U shaped trough connected beneath the truck, a bracket having spaced arms mounted on said truck, a threaded shaft journaled in said arms, a hand wheel mounted on the shaft between said arms and radially extending arms pivotally secured to said shaft anchoring the shaft in the tunnel to cause the rotation of the hand wheel to advance the truck and tubular cutter.

2. In a tunneling machine, the combination with a wheeled truck having a tubular saw rotatably mounted thereon, of a bracket having spaced vertical arms secured to said truck, a threaded shaft journaled in said arms, a hand wheel mounted on the shaft between said arms, and radially extending tunnel engaging arms pivotally secured to said shaft anchoring the shaft in the tunnel to cause the rotation of the hand wheel to advance the truck and tubular cutter.

In testimony whereof I affix my signature.

JOSEPH W. BLOWER.